United States Patent
Janssen et al.

(10) Patent No.: US 6,684,142 B2
(45) Date of Patent: *Jan. 27, 2004

(54) SLIP PROTECTION METHOD FOR A BELT-TYPE VARIATOR OF A CVT

(75) Inventors: Peter Janssen, Meckenbeuren (DE); Andreas Piepenbrink, Meersburg (DE)

(73) Assignee: ZF Batavia, L.L.C., Batavia, OH (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 41 days.

(21) Appl. No.: 09/525,287

(22) Filed: Mar. 15, 2000

(65) Prior Publication Data

US 2003/0045986 A1 Mar. 6, 2003

(30) Foreign Application Priority Data

Mar. 23, 1999 (DE) .......................... 199 12 999

(51) Int. Cl.$^7$ ............................ G06F 17/00; G06F 7/00; B60K 41/04
(52) U.S. Cl. ............................ 701/51; 701/53; 701/54; 477/107; 477/110; 477/115
(58) Field of Search ................................ 701/54, 53, 51; 477/107, 110, 115

(56) References Cited

U.S. PATENT DOCUMENTS

| | | | | |
|---|---|---|---|---|
| 4,706,790 A | * | 11/1987 | Lockhart et al. | 192/3.3 |
| 4,967,621 A | * | 11/1990 | Soga et al. | 74/867 |
| 5,189,611 A | * | 2/1993 | Petzold et al. | 701/58 |
| 5,203,233 A | * | 4/1993 | Hattori et al. | 74/865 |
| 6,053,843 A | * | 4/2000 | Van Vuuren et al. | 477/45 |
| 6,168,546 B1 | * | 1/2001 | Loffler et al. | 477/109 |

* cited by examiner

*Primary Examiner*—William A Cuchlinski, Jr.
*Assistant Examiner*—Brian J Broadhead
(74) *Attorney, Agent, or Firm*—Davis & Bujold PLLC

(57) ABSTRACT

A method for protecting a variator in a continuously variable belt-type transmission of a motor vehicle, simultaneously with a calculation based on an engine signal containing the magnitude of the engine torque and subsequent conversion of a contact-pressure theoretical value, providing the added safety on the variator, that the contact pressure on the variator is measured by a pressure sensor and the maximum transmissible transmission input torque is calculated with reference to this value. The maximum transmissible transmission input torque is then compared with the engine torque to the transmission and in case the maximum transmissible transmission input torque is less than the engine torque, an engine interruption is effected.

12 Claims, 2 Drawing Sheets

SLIP PROTECTION METHOD FOR A BELT-TYPE VARIATOR OF A CVT

BACKGROUND OF THE INVENTION

This invention concerns a method for protection of the variator in a continuously variable belt-type transmission.

A continuously variable automatic transmission usually comprises, among others, a start-up unit, a forward/reverse drive unit, an intermediate shaft, a differential, hydraulic and electronic control devices and a variator. The variator usually includes a primary and a secondary pulley also called primary and secondary side, wherein both pulleys are formed by bevel pulleys arranged in pairs and are provided with a torque transmitting belt-type element which rotates between the two pairs of bevel pulleys. In such a transmission the actual ratio is defined by the running radius of the belt type element which, in turn, is function of the axial position of the bevel pulleys. A continuously variable transmission (CVT transmission) is consequently a positively engaged transmission; the engine torque is transmitted by (static) friction between the belt-type element and the variator pulleys.

According to the prior art, the variator is mostly functionally divided in one side for control of the change of ratio (adjustment) and the other side for setting the necessary contact pressures (tightening) which ensure the required contact between the pulley and the belt-type element so that no slip generates. Depending on the operation setup either the primary or the secondary pulley is used for providing the contact pressures.

For this purpose the transmission control sets, in on the variator a hydraulic contact pressure in order to be able to transmit the momentary (engine) torque. The main input variables for this pressure are the momentary transmission input torque and the transmission ratio. The contact pressure should be as high as needed and as low as possible. If the pressure is too low, skidding (slip) of the variator results and thus damage to the transmission. If the pressure is too high, the transmission efficiency us unnecessarily impaired.

In order to prevent slippage between the pulley and the belt-type element, the prior art teaches the use of additional safety measures or safety factors on the calculated control pressure values. This procedure has the disadvantage that the efficiency of the automatic transmission is thereby impaired. Therefore, the additional safety measures (safety factor) must be selected to be as small as possible.

When the engine torque increases quickly, e.g. because the driver gives more gas, then simultaneously with the actual engine torque at the latest, the necessary contact pressure must be provided in the variator. For this is needed a torque signal that anticipates the actual torque, since the transmission needs a certain amount of time to calculate and provide the necessary pressures.

Such an anticipated torque signal is the driver's desired torque M_mot_driver's wish. The signal is also used as input variable for the transmission control, however, in order not to influence the driving properties negatively, the anticipation needs to be very limited in time.

Furthermore, the hydraulic (controlled) system deteriorates due to low temperatures or pollution; this anticipation may not be sufficient and slipping of the variator and thus harm to the transmission can result.

Also, even in a fixed operating condition, an error in the electronic or hydraulic system can lead to underpressure and thus to damage of the transmission when the added safety measure (safety factor) is not sufficient.

The problem on which this invention is based is to indicate, departing from the cited prior art, a method for protection of the variator in continuously variable belt-type transmissions so as to achieve the best possible efficiency of the transmission and, at the same time, optimize the prevention of damage to the transmission.

SUMMARY OF THE INVENTION

The inventive method must adapt the contact pressure to the operation point position so that it is possible to reduce the effects of an overpressure to a minimum that is relevant to the efficiency.

Accordingly, it is proposed simultaneously with the calculation based on an engine signal containing the magnitude of the engine torque and subsequent conversion of a contact pressure theoretical value loaded with added safety measures, to measure by a pressure sensor the contact pressure on the variator and to calculate with reference to this value the permissible maximum transmissible transmission input torque. The maximum transmissible transmission input torque is then compared with the engine torque to the transmission and in case the maximum transmissible transmission input torque is less than the engine torque, a controlled engine interruption is effected by the differential amount (engine torque-maximum transmissible transmission input torque), which reduces the engine torque to the transmissible value.

The engine signal is preferably a torque signal anticipating tile actual torque, e.g. the already mentioned driver's desired torque M_mot_driver's wish.

It is further proposed for the safety factors, to be stored as characteristic field, additionally to store adaptive correction characteristic fields for added safety of the contact pressure, wherein the relationship of temperature, load and reduction ratio is taken into account so as far as possible to prevent an engine interruption. It thus can be ensured that at operation temperature the safety factors do not unnecessarily increase.

The method can preferably be applied with the aid of a closed loop structure with the theoretical value of the safety factor Sf_soll as a command variable, the actual value of the safety factor Sf as controlled variable and the engine torque M_soll as correcting variable.

The advantages of the inventive method are:

A permanent protection of the variator is ensured by a controlled engine interruption when during critical situations the hydraulic contact pressure is not enough, the necessary safety factors being adapted according to temperature, load and reduction ratio and stored as correction characteristic field.

The inventive method makes possible an optimum efficiency of the transmission by minimizing at an operation temperature, the safety reserves which are not greatly required due to the possibility of an engine interruption.

One other advantage consists in that an online correction in the hydraulic control unit or in the engine control is possible throughout the service life of the system. The correction values can further be used for diagnosis purposes (earlier detection of error, error message, activation of substitute functions).

BRIEF DESCRIPTION OF THE DRAWINGS

Reference may now be had to the following description and accompanying figures, in which.

DESCRIPTION OF THE PREFERRED EMBODIMENTS

Within the scope of the closed control loop structure the theoretical value of the safety factor Sf_soll is the command variable, the actual value of the safety factor Sf is the controlled variable and the engine torque M_soll is the correcting variable.

The individual modules of the closed loop control are explained in detail in the table that follows:

| Symbol | Designation | Calculation (example) |
|---|---|---|
| R | Regulator | $M\_Soll = \left[\dfrac{Sf}{Sf\_Soll}\right] * M$ |
| M | engine closed control loop, for example | $M + a_1 M = a_1 * M\_Soll$ |
| AR | contact pressure theoretical value | |
| D | contact pressure closed loop control/hydraulic control | $P + a_2 P = a_2 * P\_Soll$ |
| C | adjusted safety factor | $Sf = \dfrac{2\mu * r_{(f(iv))}}{M * \cos a * Sf\_Soll} * P * A$ | with

| | | |
|---|---|---|
| P | contact pressure | |
| M | input pressure | |
| A | pulley surface | |
| r | actual running radius as function of the ratio: f(iv) | |
| iv | ratio | |
| a | pulley angle | |
| u | friction value of the contact belt-bevel pulley | |
| Sf | safety factor | |
| al | stationary system parameters | |

Figure 1:
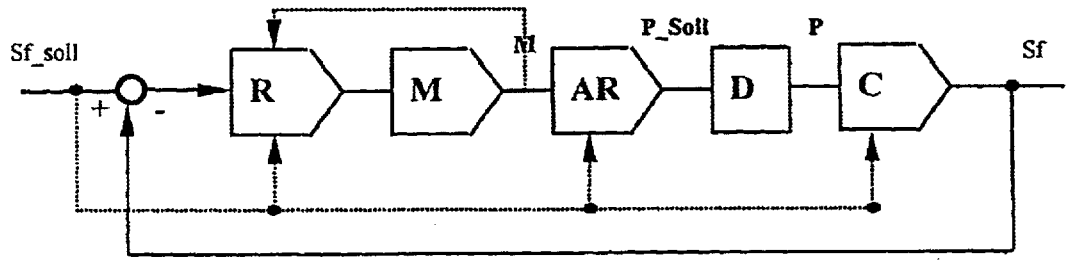
FIG. 1 is an exemplary block diagram of control loop factors through which the present invention may be implemented; and, FIG. 2 is a flow diagram of the operation of the present invention.
Figure 2:
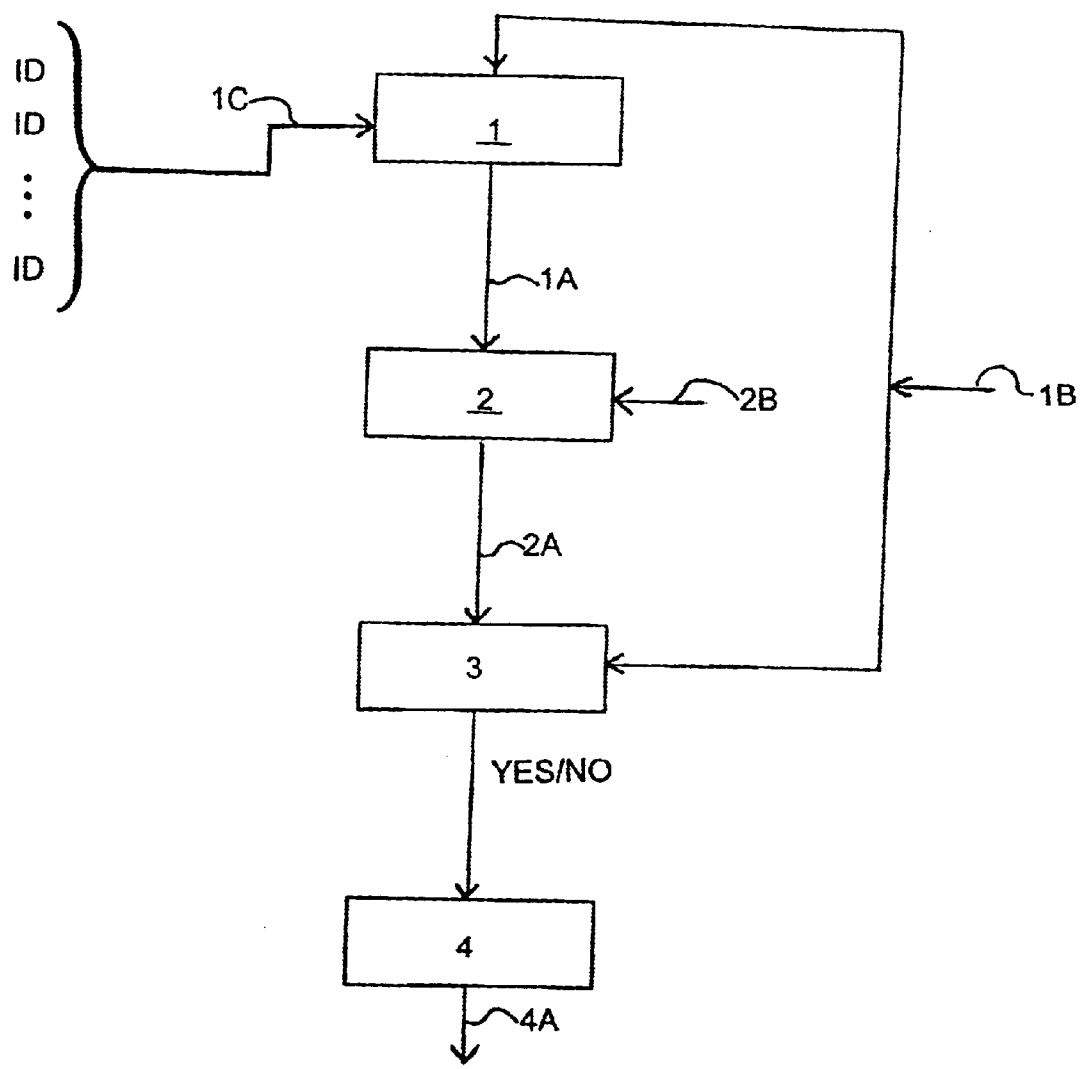

The operation of the present invention may be further illustrated by reference to the flow diagram of FIG. 2, wherein the method of the present invention is shown as including the steps of:

(Step 1) determining a maximum torque (1A) that can be safely transmitted through the variator for a predetermined maximum variator contact pressure (1B) wherein the predetermined maximum variator contact pressure incorporates a safety factor (1C) that includes one or more safety factor elements (1D) reflecting the operation conditions and state of the variator;

(Step 2) determining an anticipated pending variator input torque (2A), that is, an anticipated engine output torque, from a control input (2B) to the engine;

(Step 3) determining whether the anticipated variator input torque requires a variator contact pressure that exceeds the predetermined maximum variator contact pressure, including the safety factor; and, (Step 4) reducing the anticipated variator input torque by interrupting (4A) an operating factor of the engine.

What is claimed is:

1. A method for protecting a variator in a continuously variable belt-type transmission coupled to an engine of a motor vehicle, the method comprising the steps of:

determining an engine torque of the engine and calculating a theoretical contact pressure of the variator based on a magnitude of the engine torque;

correcting the theoretical contact pressure value using predetermined safety factors by adding the safety factors to the theoretical pressure value;

measuring, simultaneously with calculating the theoretical contact pressure of the variator, an actual contact pressure of the variator via a pressure sensor to obtain a corresponding maximum permissible transmission input torque;

determining an anticipated engine torque signal from a driver input and within a delay period less than a period between a change in the driver input and a corresponding change in the actual engine torque in order to calculate a corresponding anticipated theoretical contact pressure of the variator before the anticipated engine torque is imposed on the transmission; and comparing the maximum permissible transmission input torque with the anticipating engine torque to determine a differential value between the maximum permissible transmission input torque and the anticipated engine torque.

2. The method for protecting a variator in a continuously variable belt-type transmission according to claim 1, further comprising the step of actuating a controlled engine interruption by the differential value amount, when the maximum transmissible transmission input torque is less than the anticipated engine torque, to reduce the actual engine torque to an acceptable value.

3. The method for protecting a variator in a continuously variable belt-type transmission according to claim 2, further comprising the step of storing correcting values of one or more added safety factors for the theoretical contact pressure as characteristic fields where a corresponding relationship of temperature, load and a reduction ratio are taken into account to minimize the engine interruption.

4. The method for protecting a variator in a continuously variable belt-type transmission according to claim 3, further comprising the step of utilizing the correcting values of the added safety factors for the theoretical contact pressure for diagnosing an early error detection, an error message, and an activation of substitute functions.

5. The method for protecting a variator in a continuously variable belt-type transmission according to claim 1, further comprising the step of using a closed loop structure having a theoretical value of safety factor Sf_soll as a command variable, an actual value of the safety factor Sf as a control variable, and the engine torque M_soll as a correcting variable.

6. A method for protecting a variator in a continuously variable belt-type transmission coupled to an engine of a motor vehicle, the method comprising the steps of:

determining an engine torque of the engine and calculating a theoretical contact pressure of the variator based on a magnitude of the evaluated engine torque;

correcting the theoretical contact pressure value using predetermined safety factors by adding the safety factors to the theoretical pressure value;

measuring, simultaneously with calculating the theoretical contact pressure of the variator, an actual contact pressure of the variator via a pressure sensor to obtain a corresponding maximum permissible transmission input torque; and comparing the maximum permissible transmission input torque with the evaluated engine torque to determine a differential value between the maximum permissible transmission input torque and the engine torque; and determining an anticipated engine torque from a driver input and within a delay period less than a period between a change in the driver input and a corresponding change in the actual engine torque in order to calculate a corresponding anticipated theoretical contact pressure of the variator before the anticipated engine torque is imposed on the transmission.

7. A method for protecting a variator in a continuously variable belt-type transmission coupled to an engine of a motor vehicle, the method comprising the steps of:

determining an theoretical engine torque of the engine;

calculating a theoretical contact pressure of the variator based on a magnitude of theoretical engine torque;

correcting the theoretical contact pressure value using predetermined safety factors by adding the safety factors to the theoretical pressure value;

measuring, simultaneously with calculating the theoretical contact pressure of the variator, an actual contact pressure of the variator via a pressure sensor to obtain a corresponding maximum permissible transmission input torque and comparing the maximum permissible transmission input torque with the theoretical engine torque to determine a differential value between the maximum permissible transmission input torque and the theoretical engine torque, and when the maximum permissible transmission input torque is less than the engine torque, actuating a controlled engine interruption by the differential value amount to reduce the theoretical engine torque to an acceptable value; and determining an anticipated engine torque from a driver input and within a delay period less than a period between a change in the driver input and a corresponding change in the actual engine torque in order to calculate a corresponding anticipated theoretical contact pressure of the variator before the anticipated engine torque is imposed on the transmission.

8. A method for protecting a variator in a continuously variable belt-type transmission coupled to an engine of a motor vehicle, the method comprising the steps of:

adjusting a contact pressure of the transmission by,
   determining a current engine torque to the transmission as represented by an engine torque sensor;
   based on the current engine torque to the transmission, calculating a theoretical contact pressure of the variator, the theoretical contact pressure representing a contact pressure necessary to support the current engine torque to the transmission;
   correcting the theoretical contact pressure by predetermined safety factors to provide a corrected variator contact pressure, and
   adjusting a contact pressure of the variator according to the corrected contact pressure; and limiting an engine torque input to the transmission, by
   concurrently with determining the corrected variator contact pressure,
   determining an actual current contact pressure of the variator by means of a contact pressure sensor, and
   using the actual current contact pressure, determining a corresponding current maximum transmissible transmission input torque,
   determining an anticipated engine torque as represented by a driver input representing a desired future engine torque within a delay period less than a period between a change in the driver input and a corresponding change in the actual engine torque,
   comparing the current maximum transmissible transmission input torque to the transmission with the anticipated engine torque, and
   when the anticipated engine torque exceeds the current maximum transmissible transmission input torque, and prior to the generation of the anticipated engine torque by the engine, performing a controlled engine interruption to reduce the anticipated engine torque to a value determined by the current maximum transmissible transmission input torque.

9. The method for protecting a variator in a continuously variable belt-type transmission according to claim 8, wherein the controlled engine interruption reduces the anticipated engine torque by an amount according to the differential between the anticipated engine torque and the current maximum transmissible transmission input torque.

10. The method for protecting a variator in a continuously variable belt-type transmission according to claim 8, further comprising the step of storing correcting values of one or more added safety factors for the theoretical contact pressure as characteristic fields where a corresponding relationship of temperature, load and a reduction ratio are taken into account to minimize the engine interruption.

11. The method for protecting a variator in a continuously variable belt-type transmission according to claim 8, further comprising the step of using a closed loop structure having a theoretical value of safety factor Sf_soll as a command variable, an actual value of the safety factor Sf as a control variable, and the engine torque M_soll as a correcting variable.

12. The method for protecting a variator in a continuously variable belt-type transmission according to claim 8, further comprising the step of utilizing the correcting values of the added safety factors for the theoretical contact pressure for diagnosing an early error detection, an error message, and an activation of substitute functions.

* * * * *